United States Patent [19]

Whiteman et al.

[11] Patent Number: 4,780,265

[45] Date of Patent: Oct. 25, 1988

[54] FILMS BLOWN BY THE INFLATED BUBBLE METHOD OF ALLOYS OF VINYLIDENE CHLORIDE INTERPOLYMERS AND OLEFIN POLYMERS

[75] Inventors: Nicole F. Whiteman, Angleton; David P. Flores, Lake Jackson, both of Tex.

[73] Assignee: The Dow Chemical Company, Midland, Mich.

[21] Appl. No.: 941,482

[22] Filed: Dec. 15, 1986

[51] Int. Cl.⁴ .............................................. B29C 47/88
[52] U.S. Cl. ..................... 264/564; 264/171; 264/237; 425/326.1
[58] Field of Search ............... 264/564, 171, 173, 514, 264/237; 425/326.1, 72 R, 467

[56] References Cited

U.S. PATENT DOCUMENTS

| | | |
|---|---|---|
| 3,565,737 | 2/1971 | Lefevre et al. ..................... 425/516 |
| 3,707,590 | 12/1972 | Wiggins et al. ..................... 264/567 |
| 3,836,620 | 9/1974 | Bhuta et al. ......................... 264/171 |
| 3,853,661 | 12/1974 | Sudo ..................................... 264/514 |
| 4,000,234 | 12/1976 | Pilgrim et al. ..................... 425/326.1 |
| 4,048,428 | 9/1977 | Baird, Jr. et al. .................. 264/559 |
| 4,410,482 | 10/1983 | Saubramanian ..................... 264/171 |
| 4,496,516 | 1/1985 | Schirmer .......................... 425/133.1 |
| 4,532,100 | 7/1985 | Lancaster et al. ............... 425/326.1 |
| 4,547,551 | 10/1985 | Bailey et al. ........................ 264/171 |
| 4,664,866 | 5/1987 | van der Heijden ................. 264/569 |

FOREIGN PATENT DOCUMENTS 53-45353 12/1978 Japan .................................. 264/171

Primary Examiner—Jeffery Thurlow
Attorney, Agent, or Firm—Walter J. Lee

[57] ABSTRACT

Blends of a vinylidene chloride polymer, an olefin polymer, and a compatibilizer polymer are successfully fabricated into films using the well-known inflated bubble technique, by using blow-up rates in the range of about 1.5 to 5.0 and a drawn-down ratio upwards of 6, preferably upwards of 8, but not exceeding the critical drawdown ratio of 13. At a draw-down ratio exceeding 13, the physical properties of the polymer blend are seriously diminished.

19 Claims, 2 Drawing Sheets

FILMS BLOWN BY THE INFLATED BUBBLE METHOD OF ALLOYS OF VINYLIDENE CHLORIDE INTERPOLYMERS AND OLEFIN POLYMERS

FIELD OF THE INVENTION

Blown films are prepared from blends or alloys of a vinylidene chloride polymer, an olefin polymer and a minor amount of a compatibilizing polymer.

BACKGROUND OF THE INVENTION

The present invention relates to a process for blowing films of compatibilized blends of at least two normally incompatible polymers. More particularly, the present invention relates to compatibilized and melt processible blends of a vinylidene chloride interpolymer and an olefin polymer which are blown as films using the inflated bubble technique.

Vinylidene chloride interpolymers are well known as excellent barriers to mass transport of atmospheric gases and moisture vapor. These interpolymers have limited areas of application, however, because of poor melt processing characteristics. In particular, vinylidene chloride interpolymers in a melt plasticized state have poor heat stability and low melt strength. These same interpolymers, when fabricated, tend to be brittle and to have low impact strength.

Olefin polymers, such as high density polyethylene (HDPE), low density polyethylene (LDPE), linear low density polyethylene (LLDPE), and ultra-low density polyethylene (ULDPE), generally have better melt processing characteristics than vinylidene chloride interpolymers. That is, they are melt processible over a wider range of temperatures. The olefin polymers are readily fabricated into articles. They also provide rigidity without brittleness when so fabricated. Notwithstanding such processing advantages, the olefin polymers are excessively permeable to atmospheric gases.

Efforts to combine the best features of vinylidene chloride interpolymers and olefin polymers in a polymer-polymer blend useful in blown films have been unsuccessful until now. Lack of success has been studied by comparing physical properties of the polymer-polymer blend with those of the blend components in a straight line volume fraction relationship (hereinafter referred to as "the rule of mixtures"). The physical properties of the polymer-polymer blends have generally been poorer than those predicted by following the rule of mixtures.

Various explanations have been advanced to explain the aforementioned lack of success. One such explanation was that mixing procedures used to disperse one polymer in a second polymer were inadequate.

It is now believed thatthe lack of success may be attributed to inherent physical incompatibility of vinylidene chloride interpolymers with olefin polymers. A compatibilizer (such as an ethylene copolymer containing as a copolymerized moiety an oxygen-containing monomer) can be used in creating a compatible blend or alloy of vinylidene chloride interpolymers and polyethylenes; it is known that such blends can be easily compression molded into films with good oxygen barrier properties.

EPO Application No. 85111781.2 discloses compatibilized blends, such as described immediately above, which are heat-molded under compression into films having good oxygen barrier properties.

Japanese patent application No. Sho 52-40290, filed Apr. 11, 1977 discloses blends of vinylidene chloride resins and polyolefin type resins or polystyrene type resins which are melt-extruded, then cooled, and after being cooled are biaxially stretched by tentering or by inflation.

It is well-known in the relevant arts that vinylidene chloride polymers and copolymers are lacking in sufficient melt strength to be inflated, while molten, by the bubble blowing technique. For this reason it has been customary to extrude such $VCl_2$ polymers through a circular die, then after being cooled (frozen), the solidified tube can be tentered or inflated so as to biaxially stretch the film.

It has now been discovered that blends of vinylidene chloride polymers and olefin polymers which have been compatibilized with a compatibilizing polymer can be blown as films using the inflated bubble technique wherein the stretching of the film is performed while the extruded tube of film is still molten, i.e., it is inflated before it has been cooled, if the process is controlled within certain process parameters.

SUMMARY OF THE INVENTION

The present invention concerns a process for blowing films of a compatibilized blend of polymers comprising: (a) a vinylidene chloride interpolymer, the interpolymer having polymerized therein vinylidene chloride in an amount of from about 40 to about 98 percent by weight of interpolymer and at least one monoethylenically unsaturated monomer copolymerizable therewith in an amount of from about 60 to about 2 percent by weight of interpolymer; (b) an olefin polymer and (c) a compatibilizing amount of a compatibilizing polymer, said compatibilizing polymer being selected from the group consisting of (i) ethylene interpolymers having polymerized therein from about 97 to about 60 weight percent of ethylene and from about 3 to about 40 weight percent of at least one oxygen containing species copolymerizable therewith; and (ii) olefin polymers having halogen chemically affixed thereto in an amount of from about 24 to about 44 percent by weight of polymer.

The film-blowing may be done using an apparatus designed for the blowing of films of olefin polymers using the inflated bubble technique wherein an extruded molten tube is inflated to stretch the polymer while it is still molten, and wherein the so-inflated (stretched) tube is then cooled (solidified) before passing through nip rolls which axially tense the tube and flatten the solidified tube before it is collected in or on a collection device, such as a take-up roller. It is critical, in the present invention, that the blow-up ratio (B.U.R.) in the inflation step be in the range of about 1.5:1 to about 5:1 (preferably about 2:1 to about 4:1) while maintaining the draw-down ratio (D.D.R.) to a maximum in the range of about 8:1 to about 13:1 (preferably about 9:1 to about 11:1). Furthermore, since the vinylidene chloride polymers are, when molten, susceptible to accelerated degradation when in contact with iron, such degradation releasing halogen values which are detrimental to the extruder and extrusion die, it is necessary to use materials of construction which substantially avoid having iron in contact with the molten vinylidene chloride polymers. A film-blowing apparatus made of steel, with appropriate surfaces electroless-plated with nickel metal or chrome-plated, can be used, for example, as a means for substantially avoiding contact of iron with molten vinylidene chloride polymers during the film-blowing process.

DETAILED DESCRIPTION OF THE INVENTION

Figure 1:
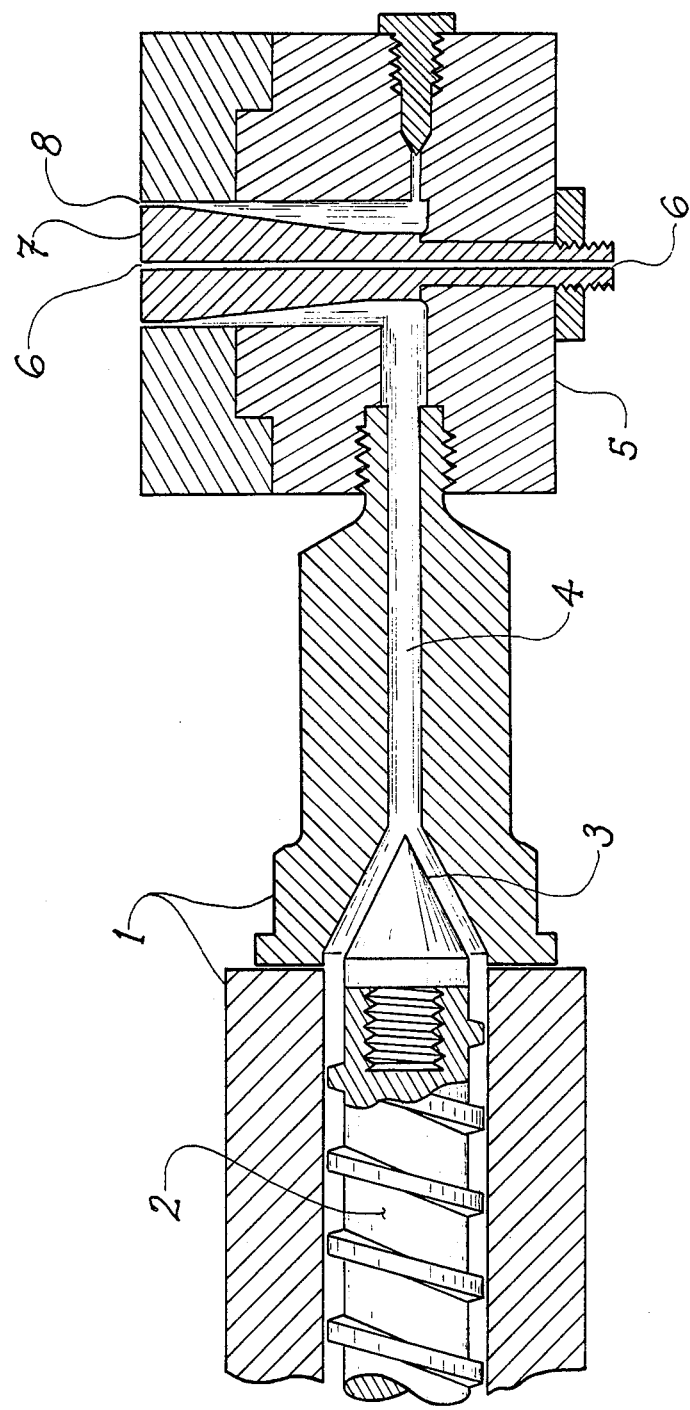
FIG. 1 is an illustration, not to scale, to serve as a visual aid in relating the inflated bubble technique and the presently claimed invention.

FIG. 1 depicts an extruder, not to scale, for film-blowing using the entrapped bubble technique. It is shown that a heated extrusion barrel (1) contains an extrusion screw (2) having a pointed tip (3) and communicates through passageway (4) with a die-head (5) which contains a gas inlet (6) in the center of annular die (7) which provides an annular port (8) for extrusion of a molten tube of polymer flowing through conduit (4) from the extrusion barrel (1). In a film-blowing operation the extruder (1) forces a molten tube of polymer through annular port (8) and the tube becomes axially stretched by nip rolls (not shown) located distal to, and in axial alignment with, the extruding tube. The nip rolls are at an appropriate distance from the annular die to provide for inflation (i.e. radial stretching) of the tube, and cooling of the tube so that the polymer is below its melting point and does not fuse to itself or stick to the nip rolls; the nip rolls flatten the tube as it pulls it, thus "closing" the bubble. Rapid cooling (if needed) may be provided by a cooling gas blown around the circumference of the bubble. From the nip rolls, the polymer may be gathered on take-up rolls or otherwise collected. Inflation of the tube while it is still molten is done by injecting an inflation gas into the tube through inlet (6) under controlled pressure to steadily provide the required blow-up ratio. The extrusion may be done vertically upward (as in FIG. 1) or vertically downward.

Vinylidene chloride interpolymers suitable for use with the present invention are those which have polymerized therein an amount of vinylidene chloride monomer and an amount of monoethylenically unsaturated monomer copolymerizable therewith. The vinylidene chloride interpolymers are desirably melt processible.

The amount of polymerized vinylidene chloride monomer is suitably from about 40 to about 98 percent by weight of interpolymer, beneficially from about 50 to 96 percent by weight of interpolymer, and desirably from about 60 to about 94 percent by weight of interpolymer.

The vinylidene chloride interpolymer comprises one or more monoethylenically unsaturated monomers which are copolymerizable with the vinylidene chloride monomer. The amount of monoethylenically unsaturated monomer is suitably from about 60 to about 2 percent by weight of interpolymer, beneficially from about 50 to about 4 percent by weight of interpolymer, and desirably from about 40 to about 6 percent by weight of interpolymer.

Monoethylenically unsaturated monomers suitable for copolymerization with vinylidene chloride include vinyl chloride, alkyl acrylates, alkyl methacrylates, acrylic acid, methacrylic acid, itaconic acid, acrylonitrile and methacrylonitrile. The unsaturated monomers are desirably selected from the group consisting of vinyl chloride, alkyl acrylates and alkyl methacrylates, the alkyl acrylates and alkyl methacrylates having from about 1 to about 8 carbon atoms per alkyl group. The alkyl acrylates and alkyl methacrylates beneficially have from about 1 to about 4 carbon atoms per alkyl group. The alkyl acrylates and alkyl methacrylates are preferably selected from the group consisting of methyl acrylate, ethyl acrylate and methyl methacrylate.

Olefin polymers suitable for use in the present invention are those olefin homopolymers and interpolymers which can be compatibilized with the vinylidene chloride interpolymers through the use of the compatibilizing polymers of the present invention.

Beneficially, the olefin polymers are selected from the group consisting of (1) low density polyethylene (LDPE), (2) medium density polyethylene (MDPE), (3) high density polyethylene (HDPE), (4) polypropylene (PP), (5) poly 1-butene (PB), (6) generally linear interpolymers of ethylene (LLDPE) having polymerized therein from about 70 to about 99 weight percent of ethylene and from about 1 to about 30 weight percent of at least one 1-alkene, said alkene having from 3 to 14 carbon atoms, (7) copolymers of two or more alpha-olefins, having from 3 to 14 carbon atoms per molecule, (8) rubbery ethylene-propylene-diene monomer interpolymers, and mixtures thereof.

Low density polyethylenes (such as made by the well-known I.C.I. process) which are useful in the present invention generally have a density of from about 0.913 to about 0.938 grams per cubic centimeter. The low density polyethylenes also have a melt index of from about 0.1 to about 200 grams per 10 minutes as measured in accordance with American Society for Testing and Materials (ASTM) Test D-1238(E).

Medium density polyethylenes which are useful in the present invention have a density of from about 0.938 to about 0.950 grams per cubic centimeter. The medium density polyethylenes also have a melt index of from about 0.08 to about 200 grams per 10 minutes (ASTM Test D-1238(E)).

High density polyethylenes which are useful in the present invention have a density of from about 0.950 to about 0.965 grams per cubic centimeter. The high density polyethylenes also have a melt index of from generally about 0.01 to about 200 grams per 10 minutes (ASTM Test D-1238(E)).

For purposes of the present invention, useful polypropylenes are the normally solid isotactic polypropylenes. The isotactic polypropylenes have an insolubility in hot heptane of greater than about 90 percent. These polypropylenes also have a melt flow rate (ASTM D-1238) of from about 0.3 to about 100 grams per 10 minutes at a temperature of 230° C. with a load of 2160 grams. The polypropylene beneficially has a melt flow rate of from about 0.3 to about 50 grams per 10 minutes.

Any poly 1-butene (PB) is believed to be suitable for use in the percent invention so long as it meets the other requirements for the olefin polymer.

For purposes of the present invention, the linear interpolymers of ethylene (a.k.a. as LLDPE) have polymerized therein an amount of ethylene and an amount of at least one 1-alkene to provide a density in the range of about 0.87 to about 0.938 gms./cc. The amount of ethylene is suitably from about 70 to about 99 percent, by weight of the interpolymer. The amount of 1-alkene is suitably from about 1 to about 30 percent, by weight of interpolymer. Preferably the LLDPE is one having a sufficient amount of 1-alkene interpolymerized therein to give a density of less than about 0.915 gm./cc, a.k.a. ULDPE (ultra-low density polyethylene).

The 1-alkene is selected from the group of 1-alkenes which have from 3 to about 14 carbon atoms per molecule. The 1-alkene is beneficially selected from the group of 1-alkenes which have from 3 to about 10 carbon atoms per molecule. The 1-alkenes having from 3 to 10 carbon atoms per molecule include, e.g., propene, butene, hexene and octene. Preferably the 1-alkene is one or more selected from the $C_4$–$C_8$ range.

Linear copolymers of ethylene and another olefin are described in U.S. Pat. No. 4,076,698, the teachings of which are incorporated herein by reference thereto.

Alpha-olefin interpolymers suitable for use with the present invention have polymerized therein two or more monomers selected from the group of alpha-olefin monomers having from about 3 to about 14 carbon atoms per molecule. The alpha-olefin monomers are represented by the general formula $R-CH=CH_2$ wherein R is an alkyl group of 1 to 12 carbon atoms, especially 2 to 6 carbon atoms.

Examples of suitable alpha-olefin monomers include propylene, butene-1, pentene-1, hexene-1, heptene-1, octene-1, nonene-1, decene-1, 4-methyl-pentene-1, 4-methyl-hexene-1 and 4,4-dimethyl-pentene-1.

The compatibilizing polymer is selected from the group consisting of (i) ethylene interpolymers having polymerized therein from about 97 to about 60 weight percent of ethylene and from about 3 to about 40 weight percent of at least one oxygen containing species copolymerizable therewith; and (ii) olefin polymers having halogen chemically affixed thereto in an amount of from about 24 to about 44 percent by weight of polymer. Preferably, the compatibilizing polymer is an ethylene copolymer or terpolymer formed by interpolymerizing ethylene with at least one of alkyl acrylate, alkyl methacrylate, vinyl alkylate, and carbon monoxide.

The compatibilizing polymer must be capable of compatibilizing a blend of the vinylidene chloride interpolymer and the olefin polymer. For the purposes of this application the blend of vinylidene chloride interpolymer and olefin polymer is considered compatibilized when the blend has mechanical properties which are generally better than those suggested by the rule of mixtures. One measure of compatibility is the impact strength of the blend which should be better than suggested by the rule of mixtures in order to say the blend is compatibilized. The oxygen permeability of compatibilized blends is very dependent on the process used in forming a film. The draw-down ratio (DDR) and the blow-up ratio (BUR) are critical and these depend largely on the viscosity of the polymer blend and the shear rate encountered in the extrusion die.

Beneficially the compatibilizing polymer will meet two additional criteria. First, it will be melt processible with the vinylidene chloride interpolymer. Second, it will preferably have a melt viscosity which is sufficiently close to that of the vinylidene chloride interpolymer and to the olefin polymer for viscosity compatibility to allow adequate mixing to occur. In the present invention it is preferred that the compatibilizing polymer have a melt flow rate in the range of about 0.1 to about 5 gms./10 min.

Two factors, which must be carefully monitored are processing time and processing temperature. In melt processing polymers, it is generally recognized that as processing temperatures increase, processing times must decrease in order to avoid undesirable results such as polymer degradation. This is especially true for vinylidene chloride interpolymers.

Vinylidene chloride interpolymers may be melt processed at temperatures of up to about 200° C. provided processing time is less than about one minute. Temperatures greater than about 200° C. may be employed provided the processing time is sufficiently short and provided the vinylidene chloride polymer is not in contact with iron or black plate steel. For example, vinylidene chloride polymers are melt processible at temperatures as high as about 230° C. at processing times of less than about ten seconds when the vinylidene chloride polymer forms an inner layer in a coextruded structure.

Melt index or melt viscosity differences affect the final oxygen permeability of the blends. Ideally, the polyolefin melt viscosity should be nearly equal or greater than the vinylidene chloride interpolymer melt viscosity. Using a typical vinylidene chloride interpolymer with a molecular weight of about 90,000 grams per mole, the Rabinowitch corrected viscosity of the polyolefin should be $\geq 12,000, \geq 8,000, \geq 5,000, \geq 3,000$ poise at shear rates of 40, 100, 200, and 400 $\sec^{-1}$ at 177° C., respectively.

The first class of compatibilizing polymer, (i), are ethylene interpolymers having polymerized therein from about 97 to about 60 weight percent of ethylene and from about 3 to about 40 weight percent of at least one oxygen containing species copolymerizable therewith. The said ethylene interpolymer is suitably selected from the group consisting of (a) ethylene interpolymers having polymerized therein from about 97 to about 60 weight percent of ethylene and from about 3 to about 40 weight percent of at least one ethylenically unsaturated carboxylic acid monomer copolymerizable therewith, the interpolymer being esterified after preparation thereof; (b) copolymers of ethylene and at least one alkyl acrylate; (c) copolymers of ethylene and at least one alkyl methacrylate; (d) copolymers of ethylene and carbon monoxide; (e) interpolymers of ethylene carbon monoxide and (1) an ester of an ethylenically unsaturated carboxylic acid or (2) vinyl acetate; (f) copolymers of ethylene and vinyl acetate; (g) ethyl oxazoline modified copolymers of ethylene and acrylic acid; (h) interpolymers of ethylene, carbon monoxide and acrylic acid; (i) interpolymers of ethylene, carbon monoxide and methacrylic acid; and (j) interpolymers of ethylene, carbon monoxide and vinyl acetate. Beneficially, the ethylene interpolymer is either (a), (b), (c), (d), (e), or (f).

Desirable results are obtained when the compatibilizer ethylene interpolymer has polymerized therein from about 97 to about 60 weight percent of ethylene and from 3 to about 40 weight percent of at least one ethylenically unsaturated carboxylic acid monomer copolymerizable therewith, the interpolymer being esterified after preparation thereof.

Suitable ethylenically unsaturated carboxylic acid monomers copolymerizable with ethylene for use as a compatibilizer include acrylic acid, methacrylic acid, and the like. Preferably, the unsaturated carboxylic acid monomer is acrylic acid.

Most preferably the compatibilizing ethylene interpolymer is selected from the group consisting of ethylene/alkyl acrylate and ethylene/alkyl methacrylate copolymers wherein the alkyl group contains from 1 to 8 especially from 1 to 4 carbon atoms, wherein the said ethylene comprises about 60% to about 97% by weight of the interpolymer.

Ethylene/acrylic acid compatibilizer copolymers are suitably prepared as outlined in U.S. Pat. Nos. 3,520,861 and 4,351,931 the teachings of which are incorporated herein by reference thereto. Methods of esterifying such copolymers are well-known in the prior art.

Preferred ethylene/acrylic acid compatibilizer copolymers, prior to esterification, have polymerized therein acrylic acid in an amount of from about 6 to about 30 percent by weight of the copolymer. The ethylene/acrylic acid copolymers also have a melt index, measured in accordance with American Society for Testing and Materials (ASTM) Test D-1238 of from about 0.01 to about 100 decigrams per minute.

Compatibilizer copolymers of ethylene with either alkyl acrylates or alkyl methacrylates are readily prepared using conventional technology. One process for preparing such copolymers is disclosed in U.S. Pat. No. 2,497,323, the teachings of which are incorporated herein by reference thereto.

Compatibilizer copolymers of ethylene and carbon monoxide are also readily prepared using conventional technology. Processes for preparing ethylene/carbon monoxide copolymers are disclosed in U.S. Pat. Nos. 4,024,325; 4,024,326; and 4,143,096, the teachings of which are incorporated herein by reference thereto.

Compatibilizer interpolymers of ethylene, carbon monoxide and (1) an ester of an ethylenically unsaturated carboxylic acid or (2) vinyl acetate are prepared using the process suitable for preparation of copolymers of ethylene and carbon monoxide.

Ethyl oxazoline modified copolymers of ethylene and acrylic acid are suitably prepared by contacting ethylene/acrylic acid copolymers with an excess of ethyl oxazoline at a temperature of from about 110° to about 120° C. for a period of from about 2 to about 24 hours.

High pressure, free-radical initiated, processes for producing copolymers of ethylene and vinyl acetate; interpolymers of ethylene, carbon monoxide, and acrylic acid; interpolymers of ethylene carbon monoxide and methacrylic acid; and interpolymers of ethylene, carbon monoxide, and vinyl acetate are well-known in the art and need not be detailed here.

The second class of compatibilizing polymers are olefin polymers having halogen chemically affixed thereto in an amount of from about 24 to about 44 percent by weight of polymer. Olefin polymers having halogen chemically affixed thereto suitably have chlorine as the halogen.

The term "olefin polymer" is meant to include olefin homopolymers and olefin interpolymers. Suitable olefin polymers are formed from one or more olefin monomers having from 2 to about 14 carbon atoms.

Beneficial compatibilizing chlorinated olefin polymers include olefin homopolymers formed from a mono-olefin monomer having from 2 to 4 carbon atoms. Exemplary of such olefin homopolymers are polyethylene, polypropylene and polybutylene. Preferred olefin homopolymers are the polyethylene resins. The olefin homopolymers have chlorine chemically affixed thereto.

Beneficial compatibilizing chlorinated olefin polymers also include olefin interpolymers formed from at least one mono-olefin monomer having from 2 to 4 carbon atoms and up to 98 weight percent of at least one 1-alkene monomer having from 4 to 14 carbon atoms. A preferred group of olefin interpolymers contain at least about 90 mole percent of ethylene and about 10 mole percent of at least one 1-alkene having from 4 to 14 carbon atoms. Exemplary of suitable 1-alkenes are butene-1, octene, 1,7-octadiene and the like. Another preferred olefin interpolymer comprises 2 mono-olefin monomers having from 2 to 4 carbon atoms. Exemplary of such interpolymers are interpolymers of ethylene and propylene. The olefin interpolymers have chlorine chemically affixed thereto.

The compatibilizing olefin polymers having chlorine chemically affixed thereto suitably have a chemically combined chlorine content of from about 24 to about 44 percent by weight of polymer. The resins also have a heat of fusion of from about 2 to about 13 calories per gram and a melt viscosity of from about 8,000 to about 20,000 poise. Melt viscosity is determined using a capillary rheometer at a temperature of 190° C., a shear rate of 145 reciprocal seconds and a capillary size of 0.127 by 5.08 centimeters.

The compatibilizing chlorinated olefin polymers, prior to chlorination, suitably have a weight average molecular weight of less than about 1,000,000 grams per mole, beneficially between about 20,000 and 300,000 grams per mole.

The compatibilizing olefin polymers are suitably prepared under the influence of catalyst systems comprising admixtures of strong reducing agents, such as triethyl aluminum, and compounds of groups IV-B, V-B and VI-B metals of the Periodic System, such as titanium tetra-chloride, and the like, and then chlorinated.

Chlorinated polyethylene resins desirable for use as compatibilizers with the present invention are prepared by suspension chlorination as disclosed in U.S. Pat. No. 3,454,544, the teachings of which are incorporated herein by reference thereto.

The compatibilized blends of the present invention are readily prepared by using conventional melt processing techniques provided two conditions are met. First, melt processing must be accomplished at a temperature below that at which decomposition of the vinylidene chloride interpolymer becomes significant. Second, sufficient shear must be generated during melt processing to provide a visually homogeneous blend within a reasonable mixing time.

Conventional melt processing equipment which may be used includes heated two-roll compounding mills, Brabender mixers, Banbury mixers, single screw extruders, twin screw extruders, and the like. Desirable results are obtained when an extruder, either single screw or twin screw, is used for melt processing the compatibilized blends of the present invention.

A factor in determining satisfactory mixing times is temperature. As noted hereinbefore, an upper limit on temperature is the temperature at which decomposition of the vinylidene chloride interpolymer becomes signficiant. A lower limit on temperature is dictated by the polymer blend component which has the greatest melting point. If the temperature does not exceed the melting point of that polymer blend component, a visually homogeneous melt will be difficult, if not impossible, to obtain.

Another factor in determining satisfactory mixing times is mixing efficiency of the melt processing equipment. Certain melt processing equipment mixes more efficiently than other melt processing equipment. Selection of melt processing equipment which will produce a visually homogeneous melt within a reasonable processing time is, however, not difficult and can be accomplished without undue experimentation.

The polymeric components of the compatible blends are generally available either in finely divided powder form or in pellet form. Either form is suitable for purposes of the present invention. The pellet (or granule) form, if available, is preferred over the powder form. In this disclosure a powder is that which has substantially all particles of less than 1 mm diameter.

A variety of additives may be added to the compatibilized blends of the present invention. Additive type and amounts thereof will depend upon several factors. One factor is the intended use of the blends. A second factor is tolerance of the blends for the additives. That is, how much additive can be added before physical properties of the blends are adversely affected to an unacceptable level. Other factors are apparent to those skilled in the art of polymer formulation and compounding.

Additives which may be incorporated into the compatibilized blends of the present invention are selected from the group consisting of plasticizers, heat stabilizers, light stabilizers, pigments, processing aids, lubricants and the like. Each of these additives is known and several types of each are commercially available.

Factors which determine the specific physical properties of the blown films of the present invention are not only in the selection of the polymer components and their ratio to each other, but also in the film-blowing parameters. It has been found that the oxygen barrier property increased with decreasing draw-down ratios (DDR); however, if the DDR is decreased too much, so that there is insufficient axial stretching of the film during the inflation of the molten film the physical strength of the ultimate film is somewhat decreased. Whereas some utility exists for such "weaker" films, such as those prepared at below a DDR of about 6:1, it is preferred that the DDR be maintained in the range of about 8:1 to about 13:1 (the critical limit). A DDR in the range of about 9:1 to about 11:1 is most preferred. At a DDR of greater than about 13:1 one encounters an unexpected sharp and detrimental decrease in physical properties. The blow-up ratio (BUR) is also critical and needs to be between about 1.5:1 to about 5:1, preferably about 2:1 to about 4:1. Low die shear rates are preferred in obtaining superior oxygen barrier properties.

The temperature employed in preparing, and extruding, the subject blends is generally in the range of about 285° F.–410° F., but is preferable in the range of about 300°–350° F. If the temperature is too low for a given blend, then excessive shear time is likely to be encountered in the mixing or extruding operation, giving poor results. If the temperature is higher than needed for good mixing and easy extrusion, then thermal decomposition is detrimentally accelerated.

The present invention is illustrated in further detail by the following examples and comparative examples. The examples and comparative examples are for purposes of illustration only and are not to be construed as limiting the scope of the present invention. All parts and percentages are by weight unless otherwise specifically noted.

Blend Preparation

Three polymeric components (a) a vinylidene chloride interpolymer, (b) an olefin polymer and (c) a compatibilizing polymer, each of which was in pellet (or granule) form, were dry blended to form a visually uniform admixture. Blending was accomplished by placing the components in a bag and then shaking them. More sophisticated equipment could have been used but was not necessary. The admixture was then fed to an extruder via a rate controlled feeding mechanism.

Alternately, melt blends of vinylidene chloride polymer, polyethylene, and a compatibilizer comprising an ethylene copolymer (e.g. ethylene/alkyl acrylate copolymer) were prepared from dry blends at various ratios of the blend components to each other, melted and homogenized on a heated two-roll mill (350° F), cooled to room temperature, and ground to pellet-sized granules.

Compression Molding to Prepare Impact Test Specimens

Pellet-sized particles of melt-blended samples were compression-molded on a Pasadena Hydraulic Press equipped with water-cooled lower platens for cooling. Samples were melted between sheets of polyethyleneterephthalate at 350° F. for 30 seconds with the platens closed but not pressured; then the platens were pressured to about 3 tons platen pressure for 1 minute and then at about 15 tons for 30 seconds. The samples were then cooled for 5 minutes under 5 tons of platen pressure.

Oxygen Permeability Testing

Oxygen permeability of the compression molded samples was measured using an instrument commercially available from Modern Controls, Incorporated, under the trade designation Oxtran 1050. Oxygen permeability measurements were made at 25° C.

Temperature dependence of permeability is known to be represented by an equation of the form $P = P_o$ raised to the exponent of $(-E_a/RT)$ where $P$ = permeability
$P_o$ = a constant
$E_a$ = activation energy of permeation
$R$ = gas constant
$T$ = absolute temperature From the equation, it is apparent that permeability increases rapidly with increasing temperature. Accordingly, an Arrhenius plot at several elevated temperatures (log P vs 1/T, wherein P and T are as identified hereinabove) can be used to extrapolate to permeabilities at lower temperatures. Extrapolation is valid so long as there are no transitions over the range of temperatures selected for taking measurements.

Those skilled in the art recognize that oxygen permeability values obtained from compression molded samples may vary from the values obtained by testing samples prepared in a different manner. Compression molded sample data are, however, a valid basis for comparison.

Polymers used in preparing polymer blends of the examples and comparative examples are set forth hereinafter in Table I.

TABLE I

| Code | Polymer Components<br>Polymer Description |
|---|---|
| VDC | A vinylidene chloride copolymer resin having polymerized therein about 85 percent vinylidene chloride and about 15 percent vinyl chloride, both percentages being based upon copolymer weight. The copolymer had a melt point of about 161° C. and a weight average molecular weight of about 90,000 grams per mole. The copolymer was commercially available |

TABLE I-continued

| Code | Polymer Components<br>Polymer Description |
|---|---|
| | from The Dow Chemical Company as Saran B-2000. |
| LDPE-A | A low density polyethylene resin having a density, determined in accordance with American Society for Testing and Materials (ASTM) Test D-792, of 0.921 grams per cubic centimeter and a melt index (ASTM Test D-1238) of 0.22 decigrams per minute. The resin was commercially available from The Dow Chemical Company under the trade designation PE 133. |
| LDPE-B | Similar to LDPE-A above except the density was about 0.920, M.I. was about 2.0 and trade designation was PE 529. |
| LDPE-C | Similar to LDPE-A above except the density was about 0.920, M.I. was about 6.0 and trade designation was PE 752. |
| LDPE-D | Similar to LDPE-A above exept the density was about 0.922, M.I. was about 1.2 and trade designation was PE 681. |
| HDPE | A high density polyethylene resin having a density (ASTM Test D-1505) of 0.965 grams per cubic centimeter and a melt index, (ASTM Test D-1238) of 0.7 decigrams per minute. The resin was commercially available from The Dow Chemical Company under the trade designation HDPE 69065. |
| LLDPE | A linear low density polyethylene resin having a density of 0.919 grams per cubic centimeter (ASTM Test D-792) and a melt index of 2.3 grams per ten minutes (ASTM Test D-1238). The resin was commercially available from The Dow Chemical Company under the trade designation Dowlex TM 2047. |
| ULDPE | A linear low density polyethylene resin having a density of about 0.914 per cubic centimeter and a melt index of about 1.1 grams per ten minutes; trade designation Dowlex TM 4001. |
| EMA | An ethylene/methyl acrylate copolymer having polymerized therein 80 percent ethylene and 20 percent methyl acrylate, both percentages being based upon copolymer weight. The copolymer had a melt index (ASTM Test D-1238) of 2.4 grams per ten minutes and a density (ASTM Test D-1505) of 0.942 grams per cubic centimeter. The copolymer was commercially available from Gulf Oil Chemical Company under the trade designation. PE 2205. |
| EEA-1 | An ethylene/ethyl acrylate copolymer having polymerized therein 85 percent ethylene and 15 percent ethyl acrylate, both percentages being based upon copolymer weight. The copolymer had a melt index (ASTM Test D-1238) of 1.5 grams per ten minutes and a density (ASTM Test D-1505) of 0.930 grams per cubic centimeter. The copolymer was commercially available from Union Carbide under the trade designation DPDA 6182. |
| EEA-2 | An ethylene/ethyl acrylate copolymer having polymerized therein about 90 percent ethylene and about 10 percent ethyl acrylate, both percentages being based upon copolymer weight. The copolymer had a melt index (ASTM Test D-1238) of 1.5 grams per 10 minutes and an estimated density of about 0.93 grams per cubic centimeter. |
| EEA-3 | An ethylene/ethyl acrylate copolymer containing about 8.6% EA, with M.I. about 2.6. |
| EEA-4 | An ethylene/ethyl acrylate copolymer containing about 13.6% EA, with M.I. |

TABLE I-continued

| Code | Polymer Components<br>Polymer Description |
|---|---|
| | about 10.7. |
| EEA-5 | An ethylene/ethyl acrylate copolymer containing about 6.7% EA, with M.I. about 11.4. |
| EEA-6 | An ethylene/ethyl acrylate copolymer containing about 11.0% EA, with M.I. about 28.4. |

The examples which follow are for illustration purposes, but the scope of the invnetion is not limited to the particular examples shown.

EXAMPLE 1

Some representative blends of a VDC polymer, a polyethylene, and a compatiblizer are as follows (all are given in weight percent):

TABLE II

| Blend | % VDC | Polyolefin; % | Compatibilizer; % |
|---|---|---|---|
| A | 10 | LDPE-A; 80 | EMA; 10 |
| B | 25 | LDPE-A; 65 | EMA; 25 |
| C | 40 | LDPE-A; 50 | EMA; 10 |
| D | 65 | LDPE-A; 25 | EMA; 10 |
| E | 45.5 | LDPE-D; 45.5 | EEA-1; 9 |
| F | 25 | LDPE-B; 65 | EMA; 10 |
| G | 40 | LDPE-B; 50 | EMA; 10 |
| H | 25 | LDPE-C; 65 | EMA; 10 |
| I | 40 | LDPE-C; 50 | EMA; 10 |
| J | 40 | LDPE-A; 50 | EEA-5; 10 |
| K | 40 | LDPE-A; 50 | EEA-6; 10 |
| L | 40 | LDPE-A; 50 | EEA-4; 10 |
| M | 40 | LDPE-A; 50 | EEA-3; 10 |
| N | 40 | LDPE-A; 50 | EEA-2; 10 |
| O | 40 | LDPE-A; 50 | EMA; 10 |
| P | 40 | LDPE-B; 50 | EEA-3; 10 |
| Q | 40 | LDPE-B; 50 | EEA-2; 10 |
| R | 40 | ULDPE; 50 | EEA-4; 10 |
| S | 40 | LLDPE; 50 | EEA-2; 10 |
| T | 40 | ULDPE; 50 | EEA-2; 10 |
| U | 40 | HDPE; 50 | EEA-2; 10 |
| V | 40 | ULDPE; 50 | EEA-3; 10 |

Figure 2:
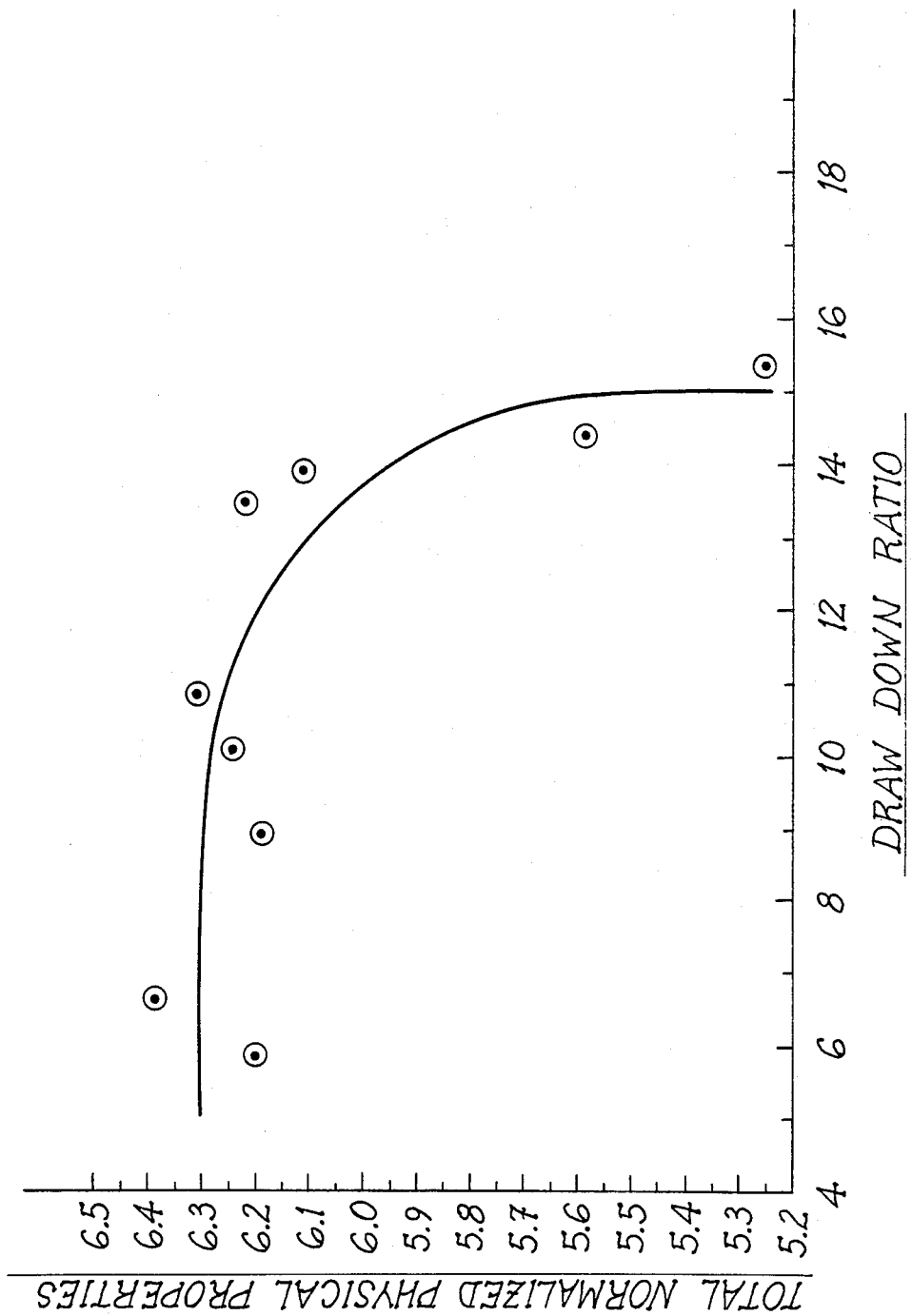
FIG. 2 is a graph illustrating the effect of draw-down ratio on the total normalized physical properties of blends of the present disclosure.

The above blends, when fabricated into blown-films by the inflated bubble technique described supra, using a BUR in the range of 1.5–5.0 and a DDR upwards of 6 experience a sharp drop in physical properties if the critical DDR limit of about 13 is exceeded and follow the general shape of the curve shown in FIG. 2.

EXAMPLE 2

For comparison purposes a given blend, i.e. Blend E of Example 1 above is shown below using blow-up ratios within, and outside of, the presently claimed invention and using draw-down ratios within, and outside of, the presently claimed invention.

TABLE III

| Test | Blow-up Ratio[1] | Draw-down Ratio[2] | Oxygen Permeability[3] |
|---|---|---|---|
| I | 0.6* | 3.3* | 10.7 |
| II | 1.0* | 9.0 | 8.3 |
| III | 1.6 | 8.7 | 4.6 |
| IV | 2.7 | 12.0 | 3.9 |
| V | 3.5 | 14.0* | 3.8 |
| VI | 4.7 | 8.9 | 2.9 |

*These are for comparison, not within the present claims
[1]Blow-up Ratio = film tube diameter/die diameter
[2]Draw-down Ratio = cross sectional area ratio of die gap to film
[3]Oxygen Permeability is cc-mil/100 in$^2$-day-atm at 25° C.

In Test I both the B.U.R. and D.D.R. were too low and the oxygen permeability was poor. In Test II the B.U.R. was low and the oxygen permeability was poor. In Test V the oxygen permeability was good, but the D.D.R. was too high as indicated in Example 1 above.

We claim:

1. A process whereby a blend consisting essential of vinylidene halide polymer and an olefin polymer is first rendered capable of being melt-blown to produce a film by the inflated-bubble technique, and is then melt-blown to produce a film by using the inflated-bubble technique, said process consisting of blending, at a temperature in the range of about 285° F. to about 410° F., the vinylidene halide polymer and olefin polymer with a compatibilizing amount of a compatibilizer polymer selected from the group consisting of (a) ethylene copolymers which contain oxygen moieties, and (b) olefin polymers or copolymers which contain halogen moieties, thereby forming a compatibilized blend wherein the weight ratio of the vinylidene halide polymer/olefin polymer/compatibilizer is in the range of about (10–75)/(85–25)/(5–25) for a total of 100 parts of total blend, extruding the so-compatibilized blend in molten form at a temperature in the range of about 285° F. to about 410° F. vertically through an annular die which is equipped with a gas inlet within the die circle, the extrudate leaving the die being in the form of a molten tube, simultaneously pulling the so-formed tube vertically through nip rollers at a predetermined drawdown ratio to flatten the tube and, at the same time, inflating the tube at a predetermined blow-up ratio by applying gas pressure within the tube, thereby creating a trapped bubble of gas within the so-inflated tube between the die and the nip rollers, the tube having solidified by cooling while so-inflated, and collecting the so-flattened tube on a take-up roller or collection device, said process being characterized by the use of a drawdown ratio in the range of not less than about 6:1 nor more than about 13:1, and a blow-up ratio in the range of about 1.5:1 to 5:1.

2. The process of claim 1 wherein the said olefin polymer comprises at least one selected from the group consisting of LDPE, MDPE, HDPE, LLDPE, ULDPE, PB, and PP.

3. The process of claim 1 wherein the said olefin polymer comprises LLDPE or ULDPE.

4. The process of claim 1 wherein the compatibilizer polymer comprises an ethylene copolymer which contains oxygen moieties.

5. The process of claim 1 wherein the compatibilizer polymer comprises a copolymer of ethylene with an alkyl acrylate, alkyl methacrylate, vinyl alkylate, olefinically-unsaturated carboxylic acids or carbon monoxide.

6. The process of claim 1 wherein the compatibilizer polymer comprises an olefin polymer which contains halogen moieties.

7. The process of claim 1 wherein the compatibilizer polymer comprises a chlorinated polyolefin.

8. The process of claim 1 wherein the vinylidene halide polymer is a copolymer of vinylidene chloride and vinyl chloride.

9. The process of claim 1 wherein the temperature is in the range of about 300° F. to about 350° F.

10. The process for fabricating a blown film from a molten blend consisting of 10 to 75 weight percent of vinylidene chloride polymer, 85 to 25 weight percent of a polymethylene, and 5 to 25 weight percent of a compatiblizing amount of an ethylene copolymer for a total of 100 percent of total blend, said process consisting of continuously extruding, at a temperature in the range of about 285° F. to about 410° F., said molten blend vertically through an annular die which is equipped with a gas conduit within the die circle, the extrudate from the die being in the form of a tube, simultaneously pulling the so-formed tube vertically through nip rollers at a predetermined drawdown ratio to flatten the tube and, at the same time, inflating the tube at a predetermined blow-up ratio by applying gas pressure with said tube, thereby creating a trapped bubble of gas within the so-inflated tube between the die and the nip rollers, the tube having been solidified by cooling while so-inflated, and collecting the so-flattened tube on a takeup roller or collection device, said process being characterized as one wherein the said draw-down ratio is in the range of about 6:1 to about 13:1, and the said blow-up ratio is in the range of 1.5:1 to 5:1.

11. The process of claim 10 wherein the compatibilizing ethylene copolymer comprises ethylene copolymerized with at least one copolymerizable comonomer of the group consisting of alkyl acrylates, vinyls, olefinically-unsaturated carboxylic acids, alkyl methacrylates and carbon monoxide.

12. The process of claim 10 wherein the compatibilizing ethylene copolymer comprises an ethylene/alkyl acrylate copolymer, wherein the alkyl group contains 1 to 8 carbon atoms and the acrylate group is acrylic or methacrylic.

13. The process of claim 10 wherein the compatibilizing ethylene copolymer comprises ethylene/ethyl acrylate copolymer or ethylene/methyl acrylate copolymer.

14. The process of claim 10 wherein the temperature is in in the range of about 300° F. to about 350° F.

15. The process of claim 10 wherein the amount of compatibilizing ethylene copolymer is in the range of about 5% to about 20% by weight of the total weight.

16. The process of claim 10 wherein the vinylidene chloride comprises a copolymer of vinylidene chloride and vinyl chloride.

17. The process of claim 10 wherein the polyethylene is selected from the group consisting of LDPE, MDPE, HDPE, LLDPE, and ULDPE.

18. The process of claim 10 wherein the polyethylene is LLDPE or ULDPE.

19. The process of claim 10 wherein the polyethylene is an ultra-low density linear polymer of ethylene copolymerized with a minor amount of a $C_4$–$C_{12}$ alpha-olefin.

* * * * *